United States Patent [19]

Cotter et al.

[11] Patent Number: 4,849,503

[45] Date of Patent: Jul. 18, 1989

[54] NOVEL POLY(ARYL ETHERS)

[75] Inventors: Robert J. Cotter, Bernardsville; Stephen B. Rimsa, Lebanon; Robert Barclay, Jr., Trenton; George T. Kwiatkowski, Greenbrook; James E. Harris, Piscataway, all of N.J.

[73] Assignee: Amoco Corporation, Chicago, Ill.

[21] Appl. No.: 135,740

[22] Filed: Dec. 21, 1987

[51] Int. Cl.[4] .................. C08G 8/02; C08G 14/00
[52] U.S. Cl. .................... 528/171; 528/126; 528/128; 528/173; 528/174; 528/176; 528/179
[58] Field of Search ............... 528/171, 176, 179, 128, 528/173, 126, 174

[56] References Cited

U.S. PATENT DOCUMENTS 4,108,837  8/1978  Johnson et al. ............ 528/173
4,727,131  2/1988  Kock et al. ................ 528/171

Primary Examiner—John Kight
Assistant Examiner—M. L. Moore
Attorney, Agent, or Firm—Donald M. Papuga; William H. Magidson; Ralph C. Medhurst

[57] ABSTRACT

Described herein are novel poly(aryl ethers) based on 2,5-di-t-butylhydroquinone. These poly(aryl ethers) have excellent high temperature, oxidative and chemical resistance, as well as good melt-fabricability.

7 Claims, No Drawings

NOVEL POLY(ARYL ETHERS)

FIELD OF THE INVENTION

Novel poly(aryl ethers) based on 2,5-di-t-butylhydroquinone are described. These materials have excellent high temperature, oxidative and chemical resistance, as well as good melt-fabricability. The introduction of 2,5-di-t-butylhydroquinone into the polymers results in a significant increase of their glass transition temperatures (Tg) and a decrease in their water absorption.

BACKGROUND OF THE INVENTION

Poly(aryl ether sulfones) have been known for about two decades; they are tough linear polymers that possess a number of attractive features such as excellent high temperature resistance, good electrical properties, and very good hydrolytic stability. Two poly(aryl ether sulfones) are commercially available. A poly(aryl ether sulfone) is available from Imperial Chemical Industries Limited. It has the formula (1)

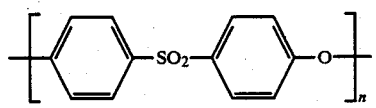

and is produced by polycondensation of 4,4'-dihydroxydiphenyl sulfone with 4,4'-dichlorophenyl sulfone, as described in Canadian Pat. No. 847,963. The polymer contains no aliphatic moieties and has a heat deflection temperature of approximately 210° C. Another commercial poly(aryl ether) is available from Amoco Performance Products, Inc. under the trademark UDEL ®. It corresponds to formula (2) and has a heat deflection temperature of about 180° C.

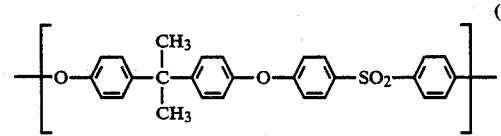

Polymer (2) is prepared via the nucleophilic polycondensation reaction of 2,2-bis(4-hydroxyphenyl) propane ("bisphenol-A") with 4,4,-dichlorodiphenyl sulfone. This method, described by Johnson et al., Journal of Polymer Science, A-1, Vol. 5, 1967, pp. 2415–2427, and Johnson et al., U.S. Pat. Nos. 4,107,837 and 4,175,175, has been shown to be quite general and applicable for the synthesis of a broad range of other poly(aryl ethers) (hereinafter called PAE's ). Using this approach, a host of PAE's having wide ranging properties was prepared. Materials (1) and (2) display relatively low glass-transitions and, hence, low heat distortion temperatures. The drawback is serious, since it makes the two polymers unsuitable in applications where a very high Tg is important. Such applications include, for example, the area of composites which often require a matrix capable of maintaining structural integrity at (very) high temperatures. Thus, an intensive search for high Tg poly(aryl ethers) has been underway for years.

An example of high Tg poly(aryl ethers) that were studied are those containing the 4,4'-bis(phenylsulfonyl)biphenyl units (3):

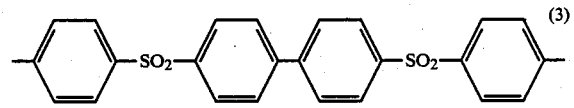

U.S. Pat. No. 3,647,751 depicts polymers of formula (4):

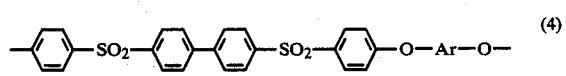

wherein Ar is defined as a diphenylene or naphthylene radical or a polynuclear divalent radical of the formula:

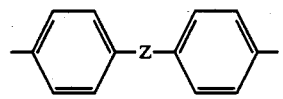

where Z is a divalent aliphatic, cycloaliphatic or arylaliphatic radical containing 1 to 8 carbon atoms or —O—, —S—, —SO—, —SO$_2$—, or —CO—.

U.S. Pat. No. 3,634,355 describes a number of polymers prepared from 4,4'-bis(4-chlorophenylsulphonyl)-biphenyl (5).

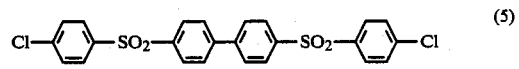

For instance, in Example 15 of the above patent, the following polymer is provided:

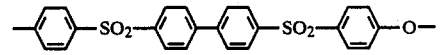

Example 16 depicts the polymer containing units (6) and (7) in a 4:1 molar ratio.

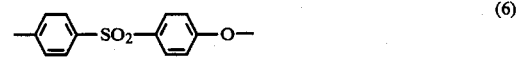

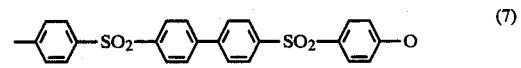

Example 17 shows the same structure, except that units (6) and (7) are present in a 1:1 ratio.

The homopolymer (7) is described in U.S. Pat. No. 4,009,149.

Copolymers containing units (3) are also the subject of a patent application (Ser. No. 81,344), filed on Aug. 4, 1987 in the names of James Elmer Harris, Louis Michael Maresca and Markus Matzner, titled "Polyaryl Ether Sulfones", and commonly assigned.

Other poly(aryl ethers) displaying high glass transition temperatures are, for example, those containing terphenylene, naphthylene, anthracenylene and fluorene-9,9-bis(phenylene) units (8):

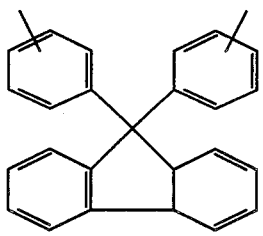
(8)

All of the above materials often show two basic drawbacks: either the required monomers are difficult to come by and must be prepared via long and tedious synthetic routes; and/or it is very difficult to prepare the final high Tg polymers at satisfactory molecular weights.

DESCRIPTION OF THE INVENTION

It was now unexpectedly discovered that the incorporation of 2,5-di-t-butylhydroquinone [DTBHQ (9)]into poly(aryl ethers) yields high Tg polymers displaying

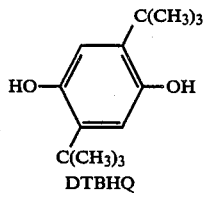
(9)

DTBHQ excellent high temperature, oxidative and chemical resistance; moreover, the new materials are easy to meltfabricate and have a low water absorption. Some members of this class of polymers, for example the polyether from (9) and 4,4'-dichlorodiphenylsulfone are also crystalline and display good solvent, chemical and stress-crack resistance.

The polymers of the instant invention are of the formula (10):

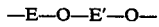
—E—O—E'—O— (10)

wherein E is the residue of one or more dihydric phenols, and E' is the residue of one or more activated dihalo- or dinitrobenzenoid compounds, having an inert electron withdrawing group in at least one of the positions ortho and/or para to the valence bonds; both of said residua are covalently bonded to the ether oxygen through aromatic carbon atoms. The diradical (11):

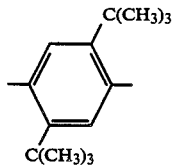
(11)

constitutes at least 5 mole percent, and up to 100 mole percent, of the residue E. In addition to (11), the poly(aryl ethers) of the instant invention may contain up to 95 mole percent of E residues derived from other diphenols. It is preferred that these additional dihydric phenols be weakly acidic dinuclear phenols such as, for example, the dihydroxy diphenyl alkanes or the nuclear halogenated derivatives thereof, such as, for example, the 2,2-bis(4-hydroxyphenyl) propane, 1,1-bis(4-hydroxyphenyl)2-phenyl ethane, bis(4-hydroxyphenyl)methane, or their chlorinated derivatives containing one or two chlorines on each aromatic ring. Other materials also termed appropriately bisphenols are also highly valuable and preferred. These materials are the bisphenols of a symmetrical or unsymmetrical joining group, as, for example, ether oxygen (—O—), sulfone

or hydrocarbon residue in which the two phenolic nuclei are joined to the same or different carbon atoms of the residue.

Such dinuclear phenols can be characterized as having the structure:

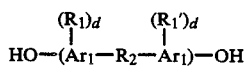

$$HO-(Ar_1-R_2-Ar_1)-OH$$

wherein $Ar_1$ is an aromatic group and preferably is a phenylene group, $R_1$ and $R_1'$ can be the same or different inert substituent groups such as alkyl groups having from 1 to 4 carbon atoms, aryl, halogen atoms, i.e., fluorine, chlorine, bromine or iodine, or alkoxyl radicals having from 1 to 4 carbon atoms, the d's are independently integers having a value of from 0 to 4, inclusive, and $R_2$ is representative of a bond between aromatic carbon atoms as in dihydroxyl-diphenyl, or is a divalent radical, including for example, radicals such as —O—, —S—, —S—S— —SO—, —SO$_2$, and divalent hydrocarbon radicals such as alkylene, alkylidene, cycloalkylene, cycloalkylidene, or the halogen, alkyl, aryl or like substituted alkylene, alkylidene and cycloaliphatic radicals as well as aromatic radicals and radicals fused to both $Ar_1$ groups.

Examples of specific dihydric polynuclear phenols include among others the bis-(hydroxyphenyl) alkanes such as:
2,2-bis-(4-hydroxyphenyl)propane,
2,4'-dihydroxydiphenylmethane,
bis-(2-hydroxyphenyl)methane,
bis-(4-hydroxyphenyl)methane,
bis(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)popane,
2,2-bis-(3-isopropyl-4-hydroxyphenyl)propane,
2,2-bis-(2-isopropyl-4-hydroxyphenyl)propane,
2,2-bis-(4-hydroxy-naphthyl)propane
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenyl-propane,
2,2-bis-(4-hydroxyphenyl)1,1,1,3,3,3,-hexafluoropropane
and the like.

di(hydroxyphenyl)sulfones such as
bis-(4-hydroxyphenyl) sulfone,
2,4'-dihydroxydiphenyl sulfone,
5-chloro-2,4'-dihydroxydiphenyl sulfone,
5-chloro-4,4'-dihydroxydiphenyl sulfone,
and the like.

di(hydroxyphenyl)ethers such as
bis-(4-hydroxyphenyl) ether,
the 4,3'-, 4,2'-, 2,2'-, 2,3'-,dihydroxyphenyl ethers
4,4'-dihydroxyl-2,6-dimethyldiphenyl ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether,
4,4'-dihydroxy-3,6-dimethoxy diphenyl ether,
and the like.

dihydroxybiphenyls, such as
4,4'-biphenol, 3,4'-biphenol, and 3,3'-biphenol.

In addition, the dihydroxynaphthalenes, such as the 1,5-; 1,6-; 2,6-; 2,7- and 1,4-dihydroxynaphthalenes are also useful dihydric phenols. Finally, the mononuclear diphenols, such as hydroquinone or resorcinol may also be used as part of the E residue.

As herein used, the E term is defined as being the "residuum of the dihydric phenol" of course refers to the residue of the dihydric phenol after the removal of the two aromatic hydroxyl groups. Thus, as is readily seen, these polyarylene polyethers contain recurring groups of the residuum of the dihydric phenol and the residuum of the benzenoid compound bonded through aromatic ether oxygen atoms.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho or para to the halogen or nitro group. The dihalobenzenoid or dinitrobenzenoid compound can be either mononuclear, where the halogens or nitro groups are attached to the same benzenoid ring; or polynuclear where they are attached to different benzenoid rings, as long as there is an activating electron withdrawing group in the ortho or para position of that benzenoid nucleus. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about 1 percent and preferably below 0.5% for best results.

An electron withdrawing group is employed as the activator group in these compounds. It should be, of course, inert under the reaction conditions, but otherwise its structure is not critical. Preferred are the strongly activating groups such as the sulfone group

bonding two halogen or nitrosubstituted benzenoid nuclei, as in 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated.

The activating groups can be basically either of two types:

(a) monovalent groups that activate one or more halogens or nitro-groups on the same ring such as another nitro or halo group, phenylsulfone, or alkylsulfone, cyano, trifluoromethyl, nitroso, and hetero nitrogen, as in pyridine. (b) divalent groups which can activate displacement of halogens on two different rings, such as:

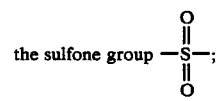

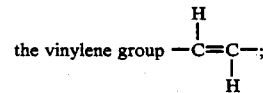

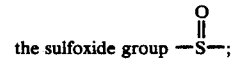

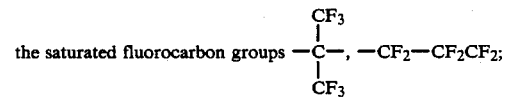

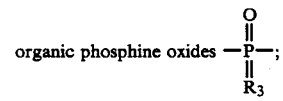

where $R_3$ is a hydrocarbon group and the ethylidene group

where A can be hydrogen or halogen.

If desired, the polymers may be made with mixtures of two or more dihalobenzenoid or dinitrobenzenoid compounds. Thus, the E' residuum of the benzenoid compounds in the polymer structure may be the same or different. It is seen also that as used herein, the E' term defined as being the "residuum of the benzenoid compound" refers to the aromatic or benzenoid residue of the compound after the removal of the halogen atom or nitro group on the benzenoid nucleus.

The polymers of this invention may be prepared by either of two methods, i.e., the carbonate method and the alkali metal hydroxide method.

In the carbonate method, the polymers are prepared by contacting substantially equimolar amounts of the hydroxy containing compounds and the activated dihalo- or dinitro benzenoid compound e.g., 4,4'-dichlorodiphenyl sulfone or 4,4'-difluorodiphenyl sulfone, with from about 0.5 to about 1.0 mole of an alkali metal carbonate per mole of hydroxyl group in a solvent mixture comprising a solvent which forms an azeotrope with water in order to maintain the reaction medium at substantially anhydrous conditions during the polymerization.

The temperature of the reaction mixture is kept at about 190° to about 250° C., preferably from about 210° to about 240° C. for about 1 to 15 hours.

In those cases where the additional diphenol is an alkylidene diphenol, such as bisphenol-A, the following two-step procedure was found to be particularly suitable. The alkylidene diphenol, the activated dihalo- and/or dinitro compounds, the solvent, and the base are charged into the reactor and heated at from about 120° to about 180° C. for about 1 to about 5 hours; the 2,5-di-t-butylhydroquinone and, optionally, any other dihydric phenol are then added, the temperature is raised, and the mixture is heated at from about 200° to about 250° C., preferably from about 210° to about 240° C., for about 1 to 10 hours. This modification is further described in the copending application of Donald R. Kelsey, et al., Ser. No. 68,973, filed July 1, 1987, commonly assigned.

The reaction is carried out in an inert atmosphere, e.g., nitrogen, at atmospheric pressure, although higher or lower pressures may also be used.

The poly(aryl ether) is then recovered by conventional techniques such as coagulation, solvent evaporation, and the like.

The solvent mixture comprises a solvent which forms an azeotrope with water and a polar aprotic solvent. The solvent which forms an azeotrope with water includes an aromatic hydrocarbon such as benzene, toluene, xylene, ethylbenzene, chlorobenzene, and the like.

The polar aprotic solvents employed in this invention are those generally known in the art for the manufacture of polyarylether sulfones and include sulfur containing solvents such as those of the formula:

in which each $R_4$ represents a monovalent lower hydrocarbon group free of aliphatic unsaturation, which preferably contains less than about 8 carbon atoms or when connected together represents a divalent alkylene group with b being an integer from 1 to 2 inclusive. Thus, in all of these solvents, all oxygens and two carbon atoms are bonded to the sulfur atom. Contemplated for use in this invention are such solvents as those having the formula:

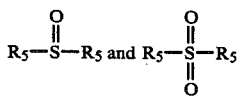

where the $R_5$ groups are independently lower alkyl, such as methyl, ethyl, propyl, butyl, and like groups, and aryl groups such as phenyl and alkylphenyl groups such as the tolyl group, as well as those where the $R_5$ groups are interconnected as in a divalent alkylene bridge such as:

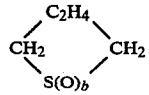

in tetrahydrothiophene oxides and dioxides. Specifically, these solvents include dimethylsulfoxide, dimethylsulfone, diphenylsulfone, diethylsulfoxide, diethylsulfone, diisopropylsulfone, tetrahydrothiophene, 1,1-dioxide (commonly called tetramethylene sulfone or sulfolane) and tetrahydrothiophene-1 monoxide.

Additionally, nitrogen containing solvents may be used. These include dimethylacetamide, dimethylformamide and N-methylpyrrolidone.

The azeotrope forming solvent and polar aprotic solvent are used in a weight ratio of from about 1:10 to about 1:1, preferably from about 1:5 to about 1:3.

In the reaction, the hydroxy containing compound is slowly converted, in situ, to the alkali salt thereof by reacting with the alkali metal carbonate. The alkali metal carbonate is preferably potassium carbonate. Mixtures of carbonates such as potassium and sodium carbonate may also be used.

Water is continuously removed from the reaction mass as an azeotrope with the azeotrope forming solvent so that substantially anhydrous conditions are maintained during the polymerization.

It is essential that the reaction medium be maintained substantially anhydrous during the polycondensation. While amounts of water up to about one percent can be tolerated, and are somewhat beneficial when employed with fluorinated dihalobenzenoid compounds, amounts of water substantially greater than this are desirably avoided as the reaction of water with the halo and/or nitro compound leads to formation of phenolic species and only low molecular weight products are secured. Consequently, in order to secure the high polymers, the system should be substantially anhydrous, and preferably contain less than 0.5 percent by weight of water during the reaction.

Preferably, after the desired molecular weight has been attained, the polymer is treated with an activated aromatic halide or an aliphatic halide such as methyl chloride or benzyl chloride, and the like. Such treatment of the polymer converts the terminal hydroxyl groups into ether groups which stabilize the polymer. The polymer so treated has good melt and oxidative stability.

While the carbonate method for preparing the polymers of this invention is simple and convenient, in some cases products of higher molecular weight can be made by the alkali metal hydroxide method. In the alkali metal hydroxide method, described by Johnson et al., U.S. Pat. Nos. 4,108,837 and 4,175,175, a double alkali metal salt of a dihydric phenol is contacted with a dihalobenzenoid compound in the presence of a sulfur containing aprotic solvent as herein above defined under substantially anhydrous conditions.

Additionally, the polymers of this invention may be prepared by other methods known in the prior art, in which at least one dihydric phenol and at least one dihalobenzenoid compound are heated, for example, with a mixture of sodium carbonate or bicarbonate and a second alkali metal carbonate or bicarbonate having a higher atomic number than that of sodium, as described in U.S. Pat. No. 4,176,222.

Halophenols or nitrophenols wherein the halogen or nitro group is activated by an electron withdrawing group in the ortho- and/or para positions can also be used for the preparation of the poly(aryl ethers). The halophenols or nitrophenols can be used in conjunction with a diphenol and a dihalo- or dinitrobenzenoid compound as defined above.

Preferred polyarylene polyethers of this invention are those prepared using the additional dihydric polynuclear phenols of the formulae (12)–(16) including the derivatives thereof which are substituted with inert substituent groups:

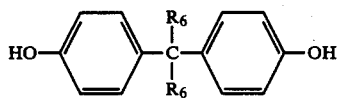
(12)

in which the $R_6$ groups represent independently hydrogen, $C_1$ to $C_4$ alkyl, $C_6$ to $C_{20}$ aryl and the halogen substituted derivatives thereof, which can be the same or different;

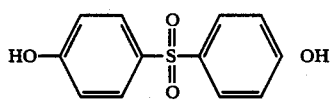
(13)

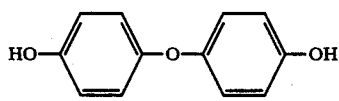
(14)

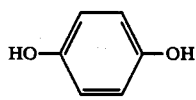
(15)

(16)

and substituted derivatives thereof.

The preferred dihalobenzenoid compounds are (17)–(9):

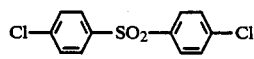
(17)

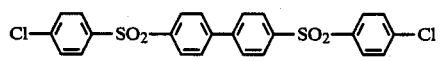
(18)

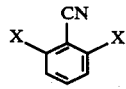
(19)

X = Cl or F

The poly(aryl ethers) exhibit a reduced viscosity of from about 0.05 to about 5.0 and preferably, from about 0.3 to about 1.5 dl/g as measured in N-methylpyrrolidone at 25° C. and at a concentration of 1.0 g/100 ml.

The polymers of this invention may include mineral fillers such as carbonates including chalk, calcite and dolomite; silicates including mica, talc, wollastonite; silicon dioxide, glass spheres; glass powders; aluminum; clay; quartz; and the like. Also, reinforcing fibers such as fiberglass, carbon fibers, and the like may be used. The polymers may also include additives such as titanium dioxide; thermal stabilizers, ultraviolet light stabilizers, plasticizers, and the like.

The polymers of this invention may be fabricated into any desired shape, i.e., moldings, coatings, films, or fibers. They are particularly desirable for molding, for fiber, and for use as electrical insulation for electrical conductors.

The polymers of this invention are useful in the manufacture of molded electrical circuit board substrates. Among the critical parameters of a circuit board, which must resist blistering or delamination during soldering, are the glass transition temperature (Tg) and water absorption of the substrate polymer. As will be shown in more detail in the examples, in many cases the substitution of DTBHQ for a portion, such as 5–60 mole percent of the dihydric phenol moiety of a polyarylether, causes a significant increase in Tg and a decrease in the equilibrium water abosrption. Water absorption is measured by immersion at ambient room temperature, i.e., about 25° C. While the resistance of a polymer to blistering under soldering conditions cannot be predicted from its structure and other properties and must be determined experimentally, in many cases the effect of increasing Tg and lowering water absorption is favorable. The inclusion of minor amounts of DTBHQ up to about 20 percent is preferred for improving soldering resistance without markedly changing the other mechanical properties.

Also, the polymers may be woven into monofilament threads which are then formed into industrial fabrics by methods well known in the art as exemplified by U.S. Pat. No. 4,359,501. Further, the polymers may be used to mold gears, bearings and the like.

As used in this invention, the glass transition temperature (Tg) of the polymers herein has a direct correlation with the heat distortion temperature of the polymers. In general, the heat distortion temperature of the polymers is typically 10° C. to 20° C. below the glass transition temperature (Tg) of the amorphous polymers.

The glass transition temperature (Tg) of the polymers prepared in the examples was measured by the resilience minimum technique using modulus-temperature data and resilience-temperature data as described in O. Olabisi et al., "Polymer-Polymer Miscibility", Academic Press, New York, 1979, pages 122–126.

EXAMPLES

The following examples serve to give specific illustrations of the practice of this invention but they are not intended in any way to limit the scope of this invention.

EXAMPLE 1

50/50 Molar DTBHQ/4,4'-dihydroxydipenyl (4,4'-biphenol)Dichlorodiphenylsulfone Copolymer In a 500 ml, four-necked flask equipped with a stainless steel mechanical stirrer, a thermocouple, an addition funnel, and a Claisen arm fitted with a nitrogen inlet tube, a distillation trap, a condenser and an exit gas bubbler, were placed the following materials:

19.93 g (89.6 mmole) 2,5-di-t-butylhydroquinone (DTBHQ),
16.69 g ( 89.6 mmole) 4,4'-biphenol,
51.69 g (180.0 mmole) 4,4'-dichlorodiphenyl sulfone,
29.85 g (216.0 mmole) anhydrous potassium carbonate, 176 g sulfolane, and
75 g chlorobenzene.

The mixture was heated under a nitrogen atmosphere; distillation of chlorobenzene and water began at 161° C. When the temperature reached 220° C., dropwise addition of chlorobenzene was begun, and heating at 220° C. was continued for 3 hours. The reaction mixture was allowed to cool to 166° C. and diluted by the addition of a mixture of chlorobenzene (200 g) and sulfolane (40 g). Methyl chloride was then sparged into the solution in order to endcap the polymer. The diluted solution was further cooled to about 110° C. and filtered through a bed of filter aid on a medium porosity fritted-glass funnel. The polymer was recovered by coagulation in methanol in a Waring blender, washed thoroughly with methanol and water, and dried in a vacuum oven at about 150° C. Yield: 37.44 g (49.8%), reduced viscosity (measured in N-methylpyrrolidone, 1 g/dl at 25° C.) 0.91 dl/g. The copolymer was analyzed for t-butyl groups by proton nuclear magnetic spectroscopy resonance; the ratio of methyl protons to aromatic protons was 0.68, compared to a theoretical value of 0.69. Properties of compression molded plaques are given in Table 1. Testing (see below) showed the polymer to be VPS Class 1.

COMPARATIVE EXAMPLE A

4,4'-Biphenol-Dichlorodiphenylsulfone Polymer

By a method similar to that of Example 1, a polymer was made from 4,4'-biphenol and dichlorodiphenyl sulfone. The properties of the products of Example 1 and Comparative Example A are compared in Table 2. The glass transition temperature of the copolymer of Example 1 was 5° C. higher than that of the comparative polymer.

EXAMPLE 2

60/40 Molar DTBHQ/Bisphenol A-Dichlorodiphenylsulfone Copolymer

In an apparatus similar to that used in Example 1, were placed the following materials:
15.46 g ( 67.7 mmole) bisphenol A,
48.82 g (170.0 mmole) 4,4'-dichlorodiphenyl sulfone,
28.19 g (204.0 mmole) anhydrous potassium carbonate,
174 g distilled sulfolane, and
75 g toluene.

This mixture was heated under a nitrogen atmosphere, distillation of toluene and water beginning at 134° C. The mixture was heated for 2 hours at 160° C. with dropwise toluene addition in order to effect endcapping of the bisphenol A. The mixture was cooled somewhat, toluene addition was interrupted, and DTBHQ (22.59 g, 101.6 mmole) was added and rinsed into the reactor with about 2 ml of toluene. The reaction mixture was then heated to 220° C., toluene addition was resumed, and the temperature was maintained at about 218°–226° C. for 3 hours. The copolymer was endcapped and recovered by coagulation essentially as described in Example 1. Yield: 44.56 g (59.8%) reduced viscosity (1.0 g/dl in N-methylpyrrolidone at 25° C.) 0.62 dl/g. Properties of compression molded plaques are shown in Table 1.

Testing of this polymer indicated that it is particularly suitable for applications in the manufacture of circuit board substrates.

In order to determine the usefulness of the polymers for circuit board applications, the polymers were tested by simulated vapor phase soldering (VPS) of samples which had been saturated with water. Molded specimens were immersed in water under ambient temperature and were weighed periodically until they appeared to have absorbed an equilibrium amount of water. The wet samples were then immersed in a fluorocarbon vapor at 215° C. for a predetermined length of time, removed, and examined. The samples were divided into three classes:

Class 1: little or no deformation;
Class 2: minor surface deformation, may have fine interior bubbles;
Class 3: severe deformation, often including large bubbles.

Experience has shown that polymers of Class 1 and Class 2, but not Class 3, can be formulated to give molded circuit boards which can be soldered without preliminary drying.

The subject polymer absorbed 0.86 percent of water at equilibrium and was VPS Class 1.

It is interesting to note that the homopolymer from bisphenol-A and 4,4'-dichlorodiphenyl sulfone has a slightly lower water absorption (0.82 percent at equilibrium). In spite of this, however, its VPS rating is Class 3.

COMPARATIVE EXAMPLE B

Bisphenol A-Dichlorodiphenylsulfone Polymer

The polymer of bisphenol A and dichlorodiphenyl sulfone was prepared by the method described by Johnson et al., J. Polymer Science, A-1, Vol. 5, 1967, pp 2415–2427. The glass transition temperature was 190° C., or 30° C. lower than that of the copolymer of Example 2.

EXAMPLE 3

79/21 Molar 4,4'-dihydroxydiphenyl sulfone (4,4'-bisphenol-S)/DTBHQ-Dichlorodiphenylsulfone Copolymer In an apparatus similar to that described in Example 1, were placed the following materials:
33.61 g (134.3 mmole) 4,4'-bisphenol S,
7.94 g ( 35.7 mmole) DTBHQ,
49.01 g (170.7 mmole) 4,4'-dichlorodiphenylsulfone,
24.29 g (175.8 mmole) anhydrous potassium carbonate,
182 g sulfolane, and
78 g chlorobenzene.

The mixture was heated under a slow stream of nitrogen; distillation of chlorobenzene and water began at 164° C. Dropwise addition of chlorobenzene was begun when the temperature reached 220° C. The mixture was then stirred at 233°–235° C. for 7 hours and allowed to cool and stand overnight with nitrogen bubbling through it. After 24 hours, the mixture was heated at about 234° C. for an additional 2 hours. The copolymer was endcapped and recovered by coagulation essentially as described in Example 1. Yield: 54.31 g (69.5%), reduced viscosity (1.0 g/dl in N-methylpyrrolidone at 25° C.), 0.61 dl/g. Properties of compression molded plaques are shown in Table 1.

COMPARATIVE EXAMPLE C

4,4'-Bisphenol S-Dichlorodiphenylsulfone Polymer

A commercially available polymer corresponding to formula (1) was tested. From the data of Table 2, it is evident that the glass transition temperature of the copolymer of Example 3 was 15° C. higher than that of the comparative polymer and that the water absorption of the copolymer of Example 3 was 0.39% lower than that of comparative polymer C.

EXAMPLE 4

45/45/10 Molar Hydroquinone/4,4'-Dihydroxydiphenyl Sulfone (4,4'-Bisphenol S)/DTBHQ-Dichloro-Diphenylsulfone Terpolymer

In an apparatus similar to that of Example 1 were placed:
21.30 g ( 85.1 mmole) Bisphenol S,
9.38 g ( 85.2 mmole) Hydroquinone,
4.21 g ( 18.9 mmole) 2,5-di-t-butylhydroquinone,
54.56 g (190.0 mmole) 4,4'-dichlorodiphenylsulfone,
27.05 g (195.7 mmole) anhydrous potassium carbonate,
177 g sulfolane, and
76 g chlorobenzene.

The mixture was heated under nitrogen, distillation of chlorobenzene and water beginning at 166° C. Dropwise addition of chlorobenzene was started at 220° C., and the temperature was maintained at 230°–235° C. for 6 hours. The polymer was endcapped and recovered essentially as described in Example 1. Yield: 53.46 g (70.7%), reduced viscosity (measured in N-methylpyrrolidone, concentration 1.0 g/dl, at 25° C.), 0.68 dl/g. Properties of compression molded plaques are shown in Table 1.

COMPARATIVE EXAMPLE D

50/50 Hydroquinone/4,4'-Bisphenol S-Dichlorodiphenylsulfone Copolymer

This copolymer was prepared by a method entirely analogous to that of Example 4 except that the heating time at 229°–235° C. was 5 hours. Yield: 52.85 g (68.8%), reduced viscosity (in N-methylpyrrolidone, 1.0 g/dl, at 25° C.), 0.69 dl/g. Properties of the terpolymer of Example 4 and the copolymer of Comparative Example D are shown in Table 2. The glass transition temperature of the terpolymer was 5° C. higher, and its water absorption was 3% lower.

EXAMPLE 5

51/34/15 Molar 4,4'-Biphenol/Bisphenol A/DTBHQ-Dichlorodiphenylsulfone Terpolymer

In an apparatus similar to that of Example 1 were placed the following materials:
13.96 g ( 61.2 mmole) bisphenol A,
51.39 g (179.0 mmole) 4,4'-dichlorodiphenyl sulfone,
29.68 g (214.8 mmole) anhydrous potassium carbonate,
160 g distilled sulfolane, and
160 g chlorobenzene.

The mixture was heated in a nitrogen atmosphere; at 147° C. distillation of chlorobenzene and water began. The mixture was stirred for 1 hour at 170° C. while chorobenzene was being added dropwise. The temperature was lowered somewhat, chlorobenzene addition was stopped, and 4,4'-biphenol (17.08 g, 91.7 mmole) and DTBHQ (6.00 g, 27.0 mmole) were added and rinsed into the reactor with a total of about 10 ml of chlorobenzene. The mixture was heated to 220° C., chlorobenzene addition was resumed, and reaction was continued at 220°–221° C. for about 4.8 hours. The terpolymer was endcapped and recovered essentially as described in Example 1. Yield: 53.30 g (70.7%), reduced viscosity (in N- methylpyrrolidone, 1.0 g/dl at 25° C.) 1.10 dl/g. Properties of compression molded plaques of the terpolymer are given in Table 1.

COMPARATIVE EXAMPLE E

60/40 Molar 4,4'-Biphenol/Bisphenol A-Dichlorodiphenylsulfone Copolymer

Copolymers of this composition could be made by methods as described in Example 5. It was found that both the glass transition temperature and the water absorption were affected by changes in the molecular weight of the copolymer. Therefore, in Table 2 ranges for both of these properties are given. In all cases, the terpolymer of Example 5 had a higher glass transition temperature and an equal or lower water absorption.

EXAMPLE 6

Polymer from DTBHQ and 4,4'-Dichlorodiphenylsulfone

In an apparatus similar to that used for Example 1, were placed the following materials:
28.01 g (126.0 mmole) of 2,6-di-t-butylhydroquinone
36.18 g (126.0 mmole) of 4,4'-dichlorodiphenylsulfone
141.0 g of diphenylsulfone, and
83.0 g of chlorobenzene.

The mixture was heated under a nitrogen atomsphere. When the temperature reached 134° C. and the diphenylsulfone was melted, the heat source was removed and anhydrous potassium carbonate (20.89 g, 151.2 mmole) was added and rinsed into the flask with a small amount of chlorobenzene. Heating was resumed, and chlorobenzene and water began to distill off at 158° C. The reaction mixture was heated at 280° C. for about 7 hours and then was poured into a metal pan and allowed to solidify. The crude product was reduced mechanically to a fine powder and then washed successively with boiling acetone (two portions), deionized water, hot 0.7 percent hydrochloric acid, and boiling methanol. The yield of polymer after drying in a vacuum oven at 150° C. was 43.36 g (78.8 percent).

DSC investigation of the polymer indicated a melting point of 387° C. (just heating cycle) and 383° C. (second heating cycle). The Tg was estimated to be about 225°–230° C.

TABLE 1

|  | Example No: | | | | | |
| --- | --- | --- | --- | --- | --- | --- |
|  | 1 | 2 | 3 | 4 | 5 | 6 |
| Copolymer Composition, Mole % | | | | | | |
| DTBHQ* | 50 | 60 | 21 | 10 | 15 | 100 |
| 4,4'-Biphenol | 50 | — | — | — | 51 | — |
| Bisphenol A | — | 40 | — | — | 34 | — |
| Bisphenol | — | — | 79 | 45 | — | — |
| Hydroquinone | — | — | — | 45 | — | — |
| DCDPS | 100 | 100 | 100 | 100 | 100 | 100 |
| Physical Properties | | | | | | |
| $T_g$, °C. | 225 | 220 | 235 | 220 | 215 | 225–230** |
| Tensile Modulus psi | 225,000 | 256,000 | 272,000 | 250,000 | 241,000 | — |

TABLE 1-continued

| | Example No: | | | | | |
|---|---|---|---|---|---|---|
| | 1 | 2 | 3 | 4 | 5 | 6 |
| Yield Strength, psi | — | — | — | — | 10,800 | — |
| Tensile Strength, psi | 11,900 | 11,400 | 11,100 | 11,700 | 10,800 | — |
| Yield Elongation, % | — | — | — | — | 7.6 | — |
| Elongation at Break, % | 8.7 | 6.4 | 5.5 | 6.9 | 15.0 | — |
| Pendulum Impact, ft lb/in$^3$ | 77 | 6 | 42 | 71 | 115 | — |
| Water Absorption, % | 1.03 | 0.86 | 1.92 | 1.67 | 0.97 | — |

*DTBHQ = 2,5-di-t-butylhydroquinone
**Estimated

TABLE 2

| Copolymer Composition, Mole % | Example No: | | | | | | | | | | |
|---|---|---|---|---|---|---|---|---|---|---|---|
| | 1 | A | 2 | B | 3 | C | 4 | D | 5 | E | 6 |
| DTBHQ | 50 | — | 60 | — | 21 | — | 10 | — | 15 | — | 100 |
| 4,4'-Biphenol | 50 | 100 | — | — | — | — | — | — | 51 | 60 | — |
| Bisphenol A | — | — | 40 | 100 | — | — | — | — | 34 | 40 | — |
| Bisphenol S | — | — | — | — | 79 | 100 | 45 | 50 | — | — | — |
| Hydroquinone | — | — | — | — | — | — | 45 | 50 | — | — | — |
| DCDPS | 100 | 100 | 100 | 100 | 100 | 100 | 100 | 100 | 100 | 100 | 100 |
| Tg, °C. | 225 | 220 | 220 | 190 | 235 | 220 | 220 | 215 | 215 | 200–210 | 225–230* |
| Water Absorption, % | 1.03 | 1.23 | 0.86 | 0.82 | 1.92 | 2.31 | 1.67 | 1.72 | 0.97 | 0.97–1.15 | — |

What is claimed is:

1. Poly(aryl ethers) of the formula

—E—O—E'—O— wherein E is the residuum of one or more dihydric phenols with at least 5 mole percent of E being the diradical

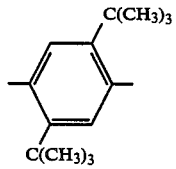

and wherein E' is the residuum of one or more activated dihalo- or dinitrobenzenoid compounds, having an inert electron withdrawing group in at least one of the positions ortho and para to the valence bond; obth of said residua being covalently bonded to the ether oxygen through aromatic carbon atoms.

2. The poly(aryl ethers) as defned in claim 1 wherein both R$_6$ groups are methyl groups.

3. The poly(aryl ethers) as defined in claim 1 wherein the E' residuum comprises one or more of the following:

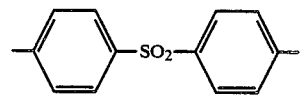

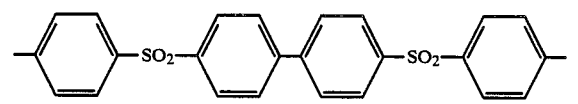

and

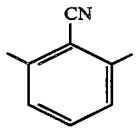

4. A circuit board substrate molded from a composition comprising the poly(aryl ethers) as defined in claim 1.

5. A circuit board substrate molded from a composition comprising the poly(aryl ether) from 4,4'-dichlorodiphenyl sulfone, 2,5-di-tert-butylhydroquinone and bisphenol-A.

6. A circuit board substrate molded from a composition comprising the poly(aryl ether) from 4,4'-dichlorodiphenyl sulfone, 2,5-di-tert-butylhydroquinone and 4,4'-biphenol.

7. Poly(aryl ethers) of the formula

—E—O—E'—O— where E is the residuum of one or more dihydric phenols comprising one or more of the following divalent radicals

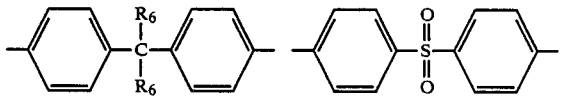

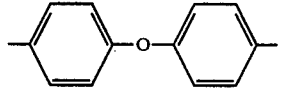

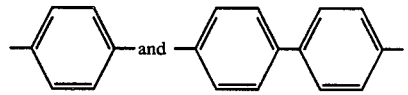

where the R$_6$ groups represent independently hydrogen, monovalent alkyl radical containing about one to about four carbon atoms, monovalent aryl radical containing about six to about twenty carbon atoms and the halogen substituted derivatives thereof, and at least 5 mole percent of E being the divalent radical

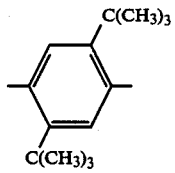

and where E' is the residuum of one or more activated dihalo- or dinitrobenzenoid compounds, having an inert electron withdrawing group in at least one of the positions ortho and para to the valence bond; both of the residua being covalently bonded to the ether oxygen through aromatic carbon atoms.

* * * * *